United States Patent
Kang (12) 
(10) Patent No.: US 6,691,035 B1
(45) Date of Patent: Feb. 10, 2004

(54) METHOD OF CALCULATING THE PATH OF A HURRICANE

(76) Inventor: Ik-Ju Kang, 10 Estates La. East, Glen Carbon, IL (US) 62034

(*) Notice: Subject to any disclaimer, the term of this patent is extended or adjusted under 35 U.S.C. 154(b) by 50 days.

(21) Appl. No.: 09/697,689

(22) Filed: Oct. 26, 2000

(51) Int. Cl.$^7$ ................................................ G01N 1/00
(52) U.S. Cl. ............................................ 702/3; 342/26
(58) Field of Search ................................ 702/3; 342/26

(56) References Cited

U.S. PATENT DOCUMENTS 6,201,494 B1 * 3/2001 Kronfeld ..................... 342/26

* cited by examiner

*Primary Examiner*—Edward Lefkowitz
*Assistant Examiner*—Anthony Gutierrez
(74) *Attorney, Agent, or Firm*—Husch & Eppenberger; Grant D. Kang, Esq.

(57) ABSTRACT

A method of predicting the future path of a hurricane using a wave model, isothermal or isobaric lines, and current hurricane direction.

4 Claims, 7 Drawing Sheets

Wave Equation for air density

Equation 1. $\quad \dfrac{\partial \rho}{\partial t} + \nabla \cdot (\rho \mathbf{v}) = 0, \quad$ mass conversion law Equation 2. $\quad \dfrac{d}{dt}(\rho \mathbf{v}) = -\nabla P + \mathbf{F}_{other} \quad$ Newton's second law of motion Equation 3. $\quad \dfrac{\partial^2 \rho}{\partial t^2} - \nabla^2 P = $ source Equation 4. $\quad \nabla^2 P = \nabla \cdot \left(\dfrac{\partial P}{\partial \rho}\right)_{s\,constant} \nabla p = \left[\dfrac{\partial P}{\partial \rho}\right]_{s\,constant} \nabla^2 \rho$ Equation 5. $\quad \nabla^2 = \left[\dfrac{\partial p}{\partial \rho}\right]$ Equation 6. $\quad \left[\dfrac{\partial p}{\partial \rho}\right] = \gamma \dfrac{p}{\rho} = \gamma \dfrac{RT}{M}, \quad \gamma = \dfrac{C_p}{C_v} = 1.4 \text{ for air}$

Figure 1

Equation 7. $\underbrace{-(\Delta p)_{max}\frac{b^2}{b^2+(r-vt)^2}}_{a} = \underbrace{-(\Delta p)_{max}}_{b}b^2\iiint\underbrace{\frac{e^{-bk}}{4\pi k}}_{c}\exp\underbrace{\left[ik*(r-vt)\right]d^3k}_{d}$

Equation 8. $\quad K_{ix} = K_{rx} = K_{tx} \quad$ phase matching

Equation 9. $\quad K_i \sin\theta_i = K_r \sin\theta_r = K_i \sin\theta_t$

Equation 10. $\quad K = \dfrac{2\pi}{\lambda} = \dfrac{2\pi f}{v} \quad$ wave vector Equation 11. $\quad \underbrace{\dfrac{\sin\theta_i}{v_i} = \dfrac{\sin\theta_r}{v_r} = \dfrac{\sin\theta_t}{v_2}}_{f}\Big\}e$

Figure 3b $$\theta_i = \theta_r \quad \text{Law of Reflection}$$

Figure 4

$$\frac{\sin\theta_i}{\sin\theta_t} = \frac{v_1}{v_2} = \sqrt{\frac{T_1}{T_2}} = \left(\frac{P_1}{P_2}\right)^{1/2} = \left(\frac{T_1}{T_2}\right)^{1/2}$$

METHOD OF CALCULATING THE PATH OF A HURRICANE

BACKGROUND OF THE INVENTION

1. Field of the Invention

This invention relates generally to hurricane prediction and, more particularly, to an improved method of predicting the future path of a hurricane.

2. Related Art

A hurricane is a major weather event that can cause a tremendous amount of property damage and death. To avoid deaths, people located in the potential path of a hurricane are often warned to leave the area. The flight of these people can cause huge traffic congestion, as well as panic buying of emergency supplies, such as gasoline, batteries, food, etc.

At the present time, there is no reliable means of determining the path that a hurricane will take. Accordingly, hurricane warnings span large geographical areas. Because the hurricane may not actually appear in the warned area, many people are forced to leave their homes due to false warnings.

In addition, due to the current unpredictability of the paths of hurricanes, hurricanes may make landfall in areas where people have not received adequate warning. In these areas, there may be a significant loss of life because people have not had an opportunity to vacate.

Accordingly, there is a need in the art for the accurate prediction of the path of a hurricane.

Currently, it is well-accepted by hurricane experts that the path of a hurricane must be predicted using a particle model. The particle model predicts qualitatively the path of a hurricane in its lifetime. Specifically, the particle model predicts that the path of a hurricane is West from birth, veers to the North, and then veers Northeast.

Use of the particle model requires data regarding many physical properties of the hurricane system. For example, the convection velocity at the center of the hurricane, including magnitude and direction must be measured. Making this measurement has proved to be more difficult, or even impractical, as some data must be acquired at a location where water vapor is condensing and imparting an additional energy boost into the convection current, thereby increasing its magnitude and altering the direction of convection velocity.

In addition, the particle model reflects the overwhelming influence of the coriolis force. Use of the coriolis force results in the ability of experts to predict the path of a hurricane over the course of a long period of time, e.g. 1 week or more. Unfortunately, this time period does not provide any predictive accuracy over short time periods. Therefore, a great deal of uncertainty is introduced into the prediction of a hurricane path for the immediate future. A particle model also requires that data be collected simultaneously.

In addition, a hurricane will occasionally "bounce" off of a land mass and be reflected backwards into the ocean. The particle model does not explain or predict this behavior accurately.

Thus, with the particle model, the data is transient, difficult to obtain, and must be collected simultaneously.

Due to the lack of accuracy and the problems associated with data acquisition, a new approach to modeling is required.

SUMMARY OF THE INVENTION

It is in view of the above problems that the present invention was developed. The invention is a method of predicting the future path of a hurricane by discarding all of the existing particle model approaches and taking a wave model approach, and more specifically, taking a pulse wave approach. Because there is no known approach to using a pulse wave model for hurricanes, the present invention must take a new approach in order to achieve this goal.

The present invention utilizes isothermal or isobaric lines, together with information on the current hurricane path, and applies a wave model to predict the future path of the hurricane.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
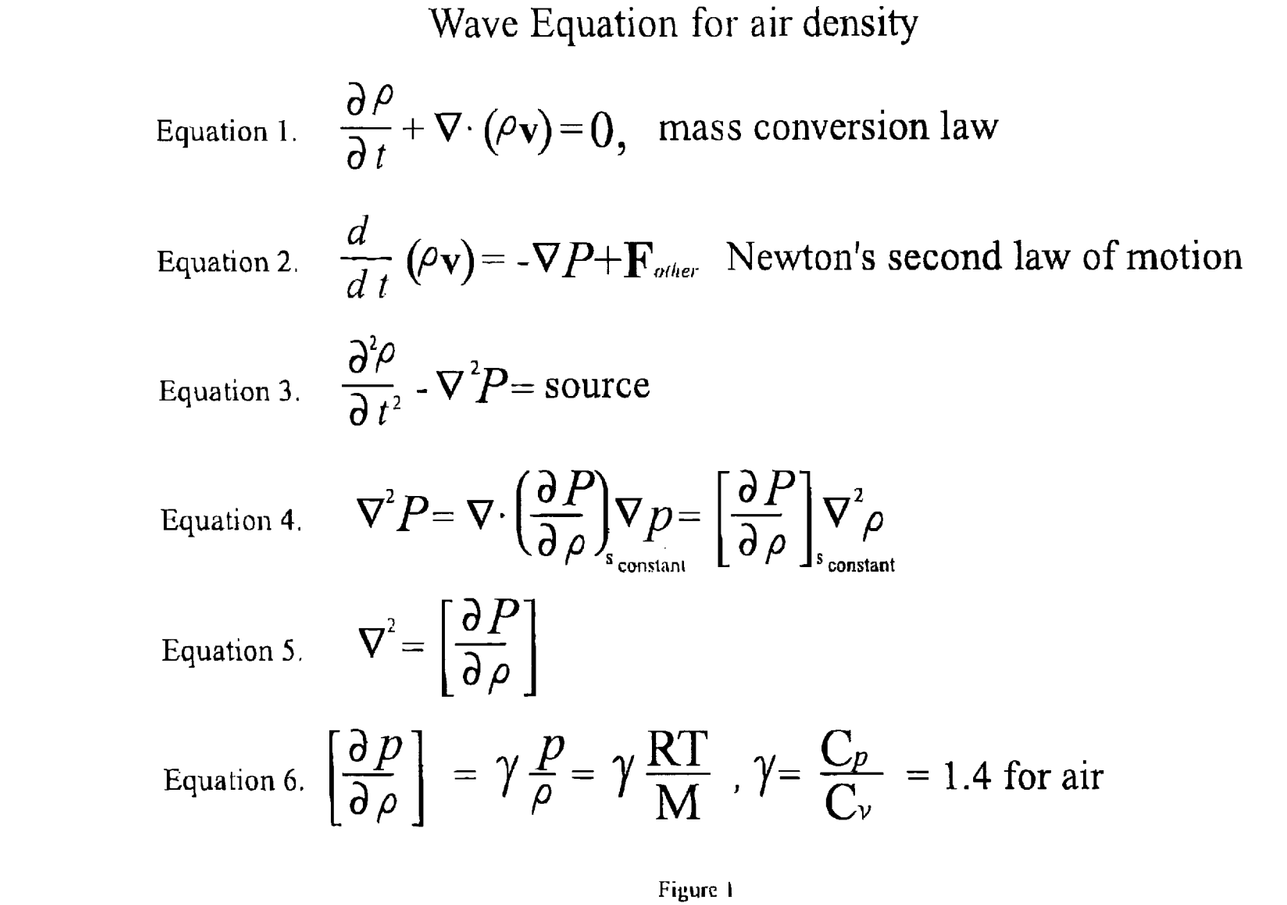
FIG. 1 illustrates the wave equation for air density.

Referring to the accompanying drawings in which like reference numbers indicate like elements, FIG. 1 illustrates the wave equation for air density. In all equations set forth in this specification: $\theta_j$ represents the angle of incidence; $\theta_r$ represents the angle of reflection; $\theta_t$ represents angle of transmission; $\rho$ represents air density; $T_1$ represents the Kelvin scale temperature of medium number 1; $T_2$ represents the Kelvin scale temperature of medium number 2; and $\gamma$ ("gamma") represents the ratio of molar heat at constant pressure $C_p$ to the molar heat at constant volume $C_v$.

Equation no. 1 is the equation of mass conservation from the law of mass conservation. Equation no. 2 is Newton's Second Law of Motion, the equation of motion. From combining Equation 1 and Equation 2, we obtain Equation 3, which is a wave equation. Equations 1, 2 and 3 are well-known.

Equation 4 expresses one term of Equation 3 in terms of air density ("rho") instead of pressure. From this, we can obtain Equation 5, which represents the phase velocity of a wave. Further, it can be seen that the partial derivative of pressure, P, with respect to density ρ ("rho") in an adiabatic process can be expressed in accordance with the ideal gas law as shown in Equation 6. R is the universal gas constant, while M is the molar weight of air.

Figure 2:
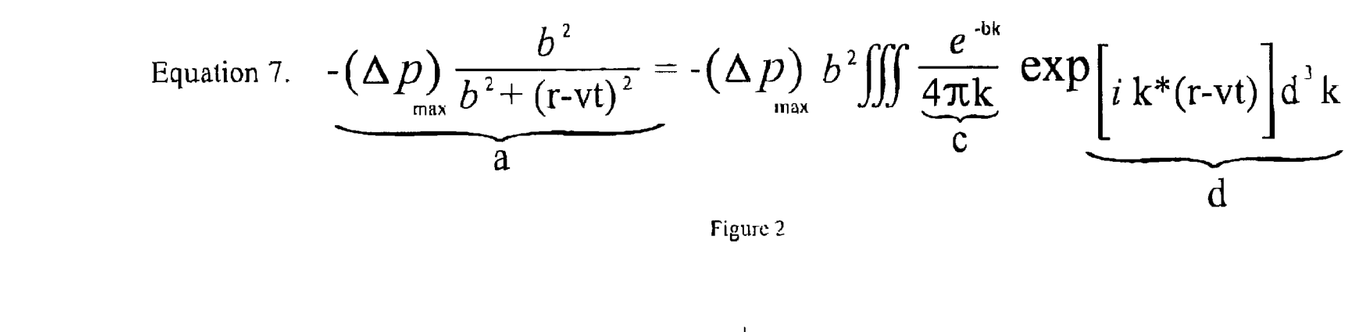
FIG. 2 illustrates justification for the proposition that a hurricane can be considered as a system of disturbances in air density, i.e., a pulse wave which is a superposition of many frequency waves.

FIG. 2 illustrates the justification for the proposition that a hurricane can be considered as a system of disturbances in air density, i.e., a pulse wave, which is a superposition of many frequency waves. Equation 7, at "a" a pulse wave in pressure, can be expressed as a superposition (integration) of various frequency waves. It should be noted that the pulse wave function is known. The variable b represents the distance from the center of the hurricane to the location where its pressure is half that of the center. The variable Δp represents the pressure difference between the hurricane center, and undisturbed pressure at a location a distance from the center. The amplitude of the plane wave is indicated at "c", where the variable "k" is a wave vector. The plane wave function is indicated at "d".

Equation 7 is unknown in the art, and is a specific contribution to the art by the inventor. Hans Bethe's integral formula was used as a tool to derive equation 7.

Equation 7 then justifies the use of a pulse wave function to model a hurricane system. When the right side of equation 7 is integrated, it becomes the left side of equation 7.

Figure 3A:
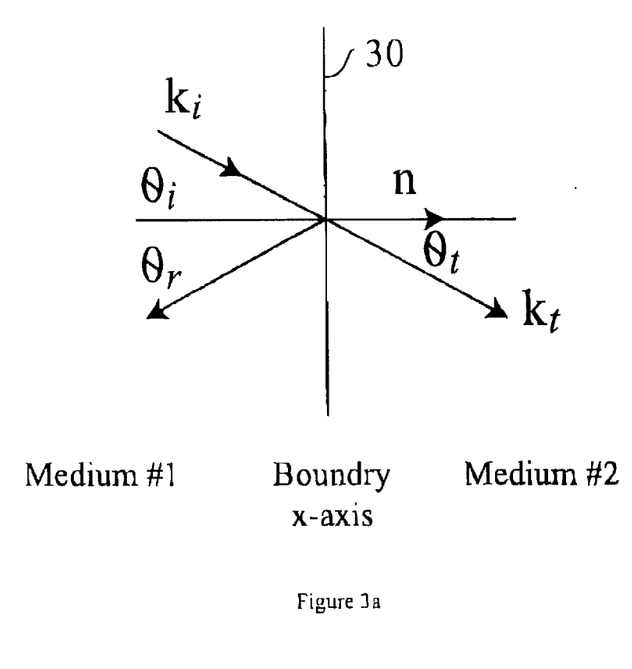
FIG. 3a illustrates phase matching of any frequency wave.

Turning to FIG. 3a, a boundary 30 separates medium 1 from medium 2. In medium 1, an incident wave vector is represented by $k_i$ at an angle to the normal at the boundary represented by $\theta_i$. Also in medium 1, the reflected wave vector $k_r$ is reflected at an angle $\theta_r$, which is an angle to the normal at the boundary.

In medium 2, the transmitted wave vector $k_t$ is making an angle $\theta_t$, with the normal at the boundary. The boundary 30 may be a pressure boundary. However, it is preferred that boundary 30 be a temperature boundary for ease of data acquisition and thus calculation.

Figure 3B:
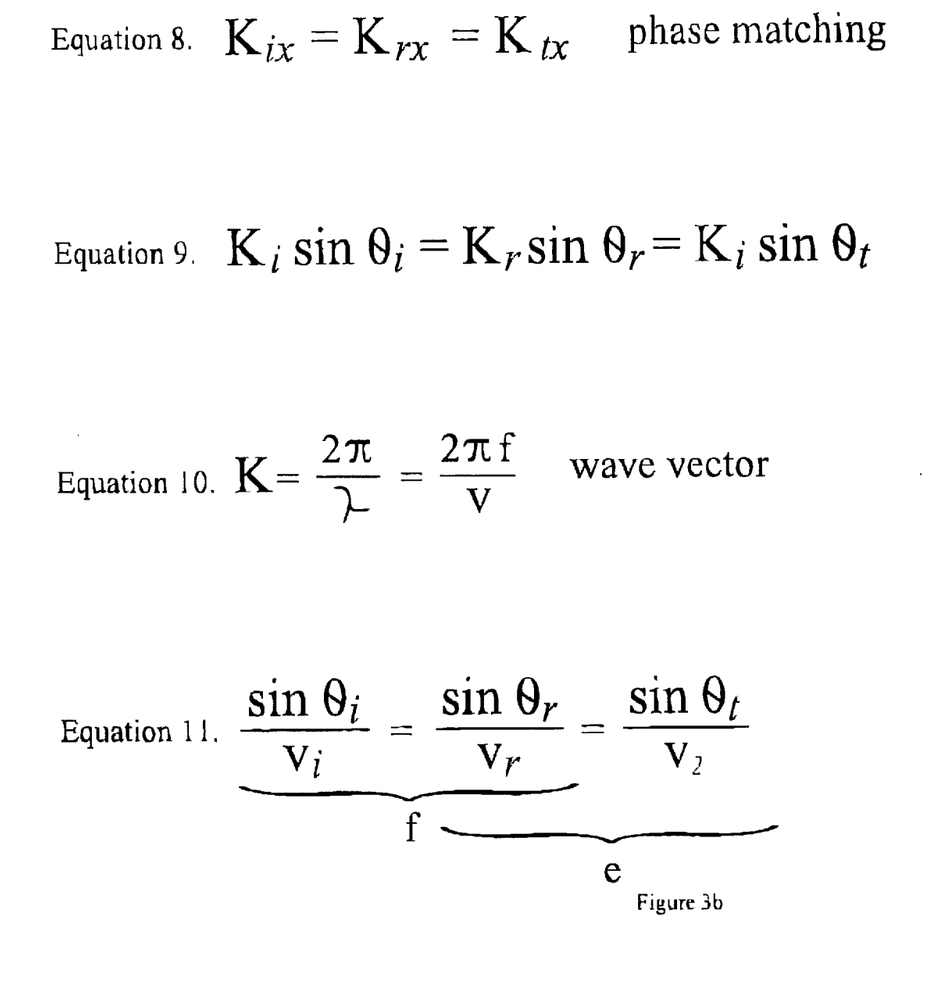
FIG. 3b illustrates phase matching of waves that yields the laws of reflection and refraction.

Turning to FIG. 3b, any component wave which is a component of the pulse in equation 7 must have a phase matching relationship at the boundary 30. This relationship is expressed in equation 8. Equation 9 represents the matched phase relationship for the incident, reflected and transmitted waves, with boundary 30 defined as the x-axis. Equation 10 results from the well-known definition of a wave vector in terms of wavelength λ ("lambda"), along with the wave relationship. Equations 9 and 10 are combined to form Equation 11. Equation 11 holds independent of (or unaffected by) the frequency. With each component pulse wave of equation 7, the relation of equation 11 holds regardless of frequency.

As stated in Equation 7, a hurricane is the sum of various frequency waves. Because each frequency wave satisfies equation 11 independent of frequency, and because equation 7 is a superposition of multiple frequency waves, then it follows that a pulse wave of equation 7 will satisfy equation 11. Therefore, a hurricane will move in accordance with equation 11.

Figure 4:
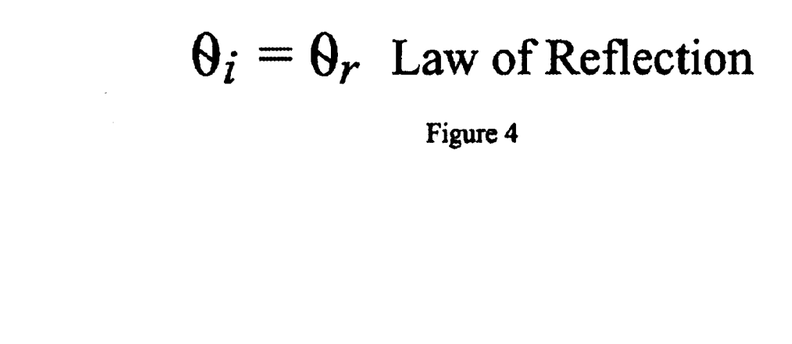
FIG. 4 illustrates the law of reflection.

Using portion "f" of equation 11, one obtains the law of reflection shown in FIG. 4.

Figure 5:
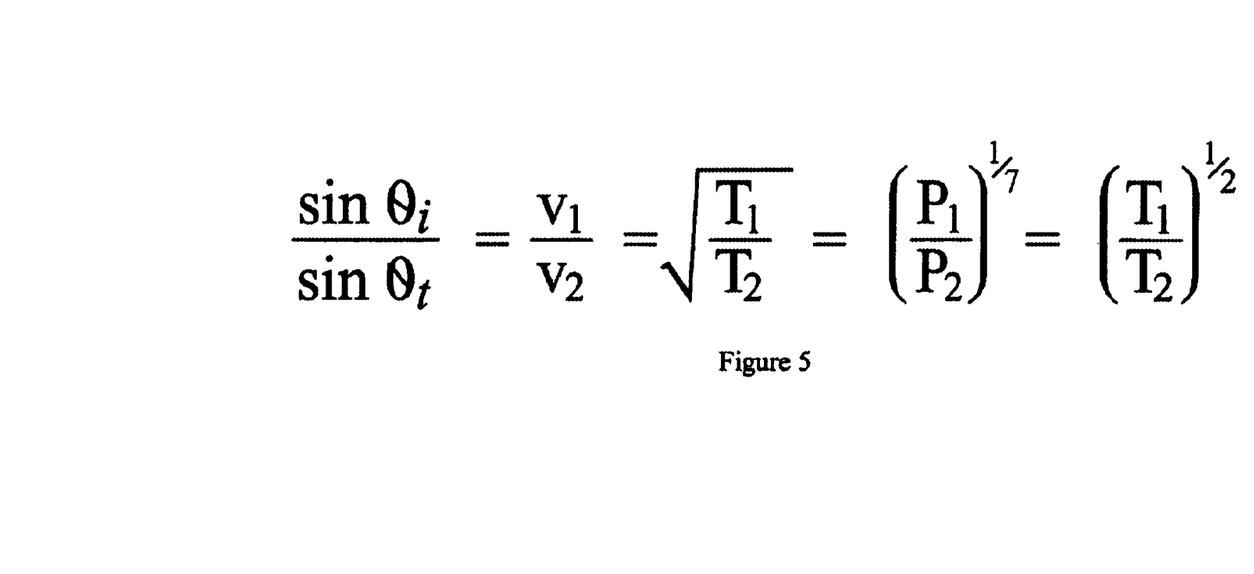
FIG. 5 illustrates the law of refraction.

Using portion "e" of equation 11, one obtains the law of refraction shown in FIG. 5.

Figure 6A:
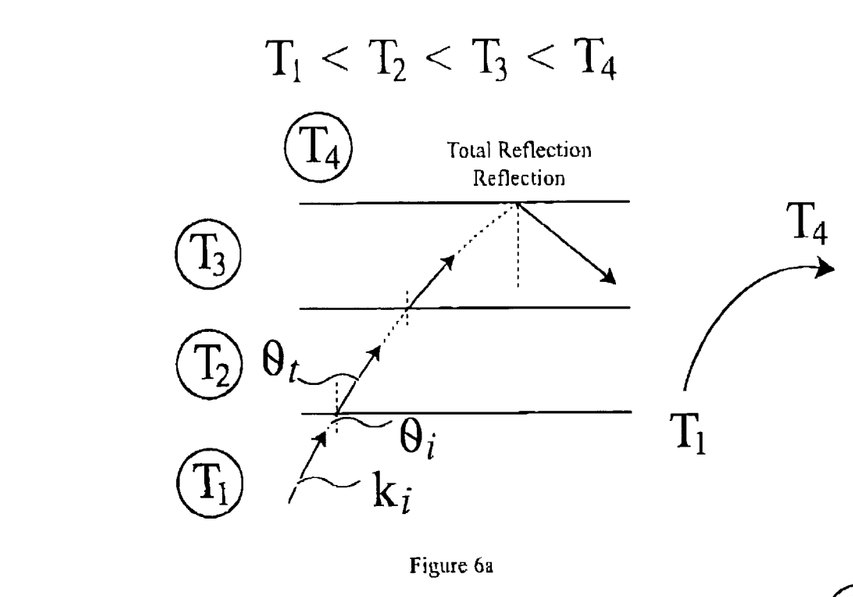
FIG. 6a illustrates the refraction and reflection of a hurricane path where $T_1$ is less than $T_2$.
Figure 6B:
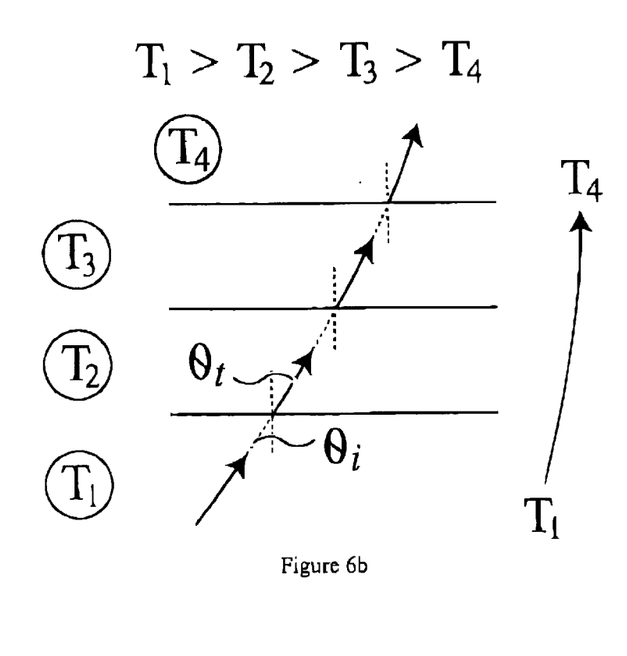
FIG. 6b illustrates a hurricane path that curves to the left side where T1 is greater than T2.
Figure 7:
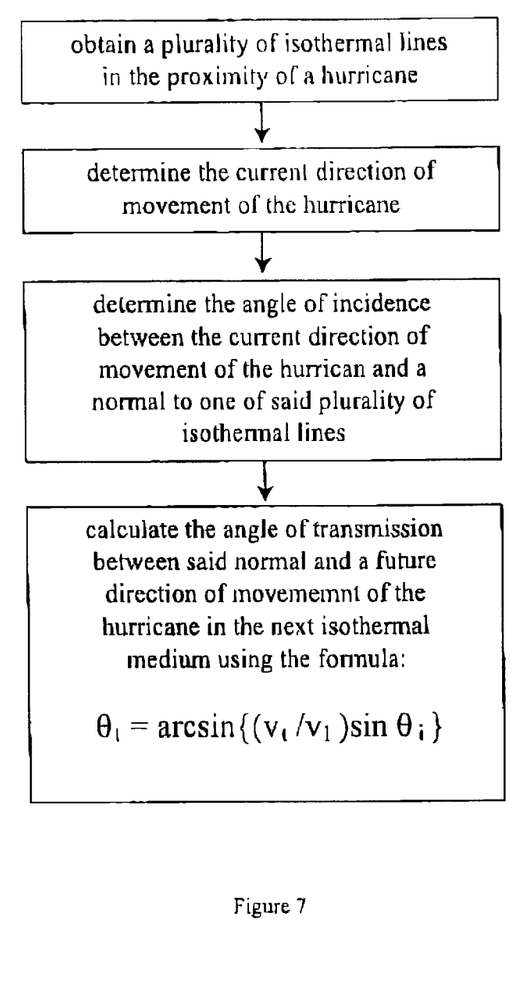
FIG. 7 illustrates a flow diagram of the steps of the invention.
Figure 8:
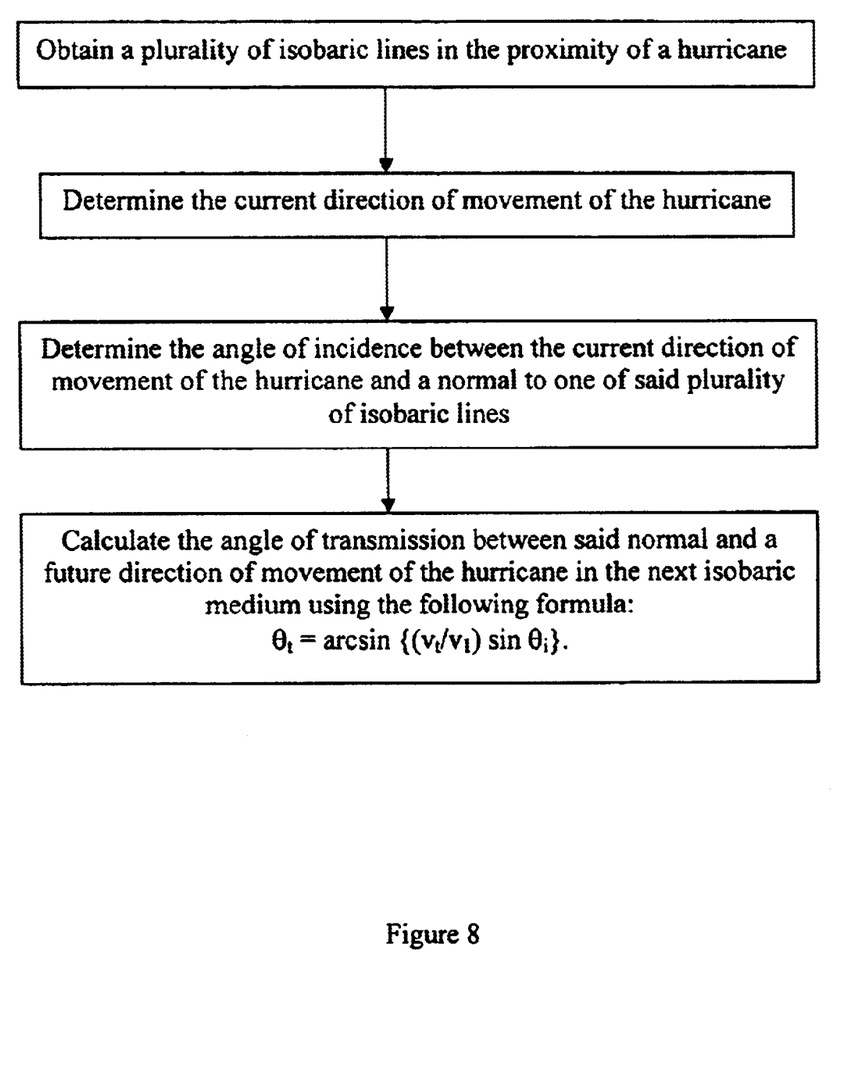
FIG. 8 illustrates a second flow diagram of the steps of the invention.

Now, we turn to the application of this discovery using FIGS. 6a and 6b. In both Figures, $T_1$ is strongly suggestive of a lower temperature, and $T_2$ is strongly suggestive of a higher temperature. 6a illustrates the refraction and reflection of a hurricane path assuming that $T_1$ is less than $T_2$. It is emphasized that $T_1$ is the temperature of the medium that the hurricane is moving through (in the present), and $T_2$ is the temperature of the medium that the hurricane is moving into. Therefore, a hurricane vector, $k_1$, moves with the instant angle $\theta_1$, at the boundary between medium 1 and medium 2. Hurricane wave vector $k_2$, in medium 2, makes an angle $\theta_2$, which will be greater than $\theta_1$ due to FIG. 5. Assuming that $T_3$ is greater than $T_2$, we obtain a $\theta_3$ that is greater than $\theta_2$, because of FIG. 5. Assuming that $T_4$ is greater than $T_3$, and $\theta_3$ is greater than the critical angle, then there will be a total reflection of the hurricane wave vector.

FIG. 6b illustrates a hurricane path that curves to the left side where $T_1$ is greater than $T_2$. The temperature of each successive medium is lower than the temperature of each preceding medium. In this case, the path of the hurricane will progress to the left. In the case shown, there is no reflection of the path of the hurricane.

In view of the foregoing, it will be seen that the several advantages of the invention are achieved and attained. The pulse wave model is simpler to apply than a particle model. In addition, the isothermal lines are readily available, and provides the ability to predict the direction of movement of the hurricane for the immediate future.

In application, a user will obtain isothermal or isobaric line information in the area surrounding a hurricane. Then data is collected and the direction of the hurricane wave path is determined. Then, $\theta_i$ is determined. Next (and after $\theta_i$ is known), equation in FIG. 5 is used to solve for $\theta_r$. Specifically, we use $\theta_r$=arc sin{$(v_r/v_1)$sin $\theta_i$} where $v_r$ and $V_1$ represent the velocity transmitted through medium 1 and the velocity at medium 1, respectively. Thus, the new angle will be calculated. This procedure is repeated for multiple isothermal lines (or isobaric lines) to determine the ultimate hurricane path over a longer distance.

It will be appreciated that the wave model is simpler in application because the isothermal lines are readily available from current weather data. The wave model of the present invention provides the ability to predict the path of a hurricane in the immediate future. The ability to provide reliable and accurate prediction results in public benefits such as easing anxiety, prevention of unnecessary expenses of those not in the immediate path of a hurricane, and a savings of time for all people.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the use of isobaric lines may be used in lieu of isothermal lines, as the wave model is applicable to the use of either data. Moreover, it may be helpful to use both calculations using isobaric and isothermal data to check accuracy of path prediction. Thus, the breadth and scope of the present invention should not be limited by any of the above-described exemplary embodiments, but should be defined only in accordance with the following claims appended hereto and their equivalents.

What is claimed is:

1. A method of predicting the path of a hurricane comprising:

obtaining a plurality of isothermal lines in the proximity of a hurricane;

determining the current direction of movement of the hurricane;

determining the angle of incidence between the current direction of movement of the hurricane and a normal to one of said plurality of isothermal lines;

calculating the angle of transmission between said normal and a future direction of movement of the hurricane in the next isothermal medium.

2. A method according to claim 1, wherein the step of calculating includes using the following formula:

$$\theta_t = \arc\sin\{(v_t/v_1)\sin\theta_i\}.$$

3. A method of predicting the path of a hurricane comprising:

obtaining a plurality of isobaric lines in the proximity of a hurricane;

determining the current direction of movement of the hurricane;

determining the angle of incidence between the current direction of movement of the hurricane and a normal to one of said plurality of isobaric lines;

calculating the angle of transmission between said normal and a future direction of movement of the hurricane in the next isobaric medium.

4. A method according to claim 3, wherein the step of calculating includes using the following formula:

$$\theta_t = \arc\sin\{(v_t/v_1)\sin\theta_i\}.$$

* * * * *